United States Patent
Paul et al.

(10) Patent No.: US 12,512,968 B2
(45) Date of Patent: Dec. 30, 2025

(54) METHOD AND SYSTEM FOR RE-ENCRYPTION OF ENCRYPTED DATA BY GENERATING RE-ENCRYPTION KEY

(71) Applicant: Tata Consultancy Services Limited, Mumbai (IN)

(72) Inventors: Arinjita Paul, Mumbai (IN); Rajan Mindigal Alasingara Bhattachar, Bangalore (IN); Imtiyazuddin Shaik, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 68 days.

(21) Appl. No.: 18/751,929

(22) Filed: Jun. 24, 2024

(65) Prior Publication Data
US 2025/0038959 A1    Jan. 30, 2025

(30) Foreign Application Priority Data
Jul. 12, 2023 (IN) .............................. 202321046971

(51) Int. Cl.
  *H04L 9/08* (2006.01)
  *H04L 9/00* (2022.01)
  *H04L 9/14* (2006.01)

(52) U.S. Cl.
  CPC ............ *H04L 9/0822* (2013.01); *H04L 9/008* (2013.01); *H04L 9/14* (2013.01)

(58) Field of Classification Search
  CPC .................... H04L 63/0281; H04L 63/0428
  See application file for complete search history.

(56) References Cited

U.S. PATENT DOCUMENTS

| 8,630,422 B2 | 1/2014 | Gentry | |
| 2002/0013898 A1* | 1/2002 | Sudia | G06Q 20/3829 380/278 |
| 2018/0212762 A1* | 7/2018 | Peddada | H04L 9/3271 |

OTHER PUBLICATIONS

Zvika Brakerski et al., "Candidate iO From Homomorphic Encryption Schemes," 2020, Weizmann Institute of Science, https://eprint.iacr.org/2020/394.pdf.

* cited by examiner

*Primary Examiner* — William J. Goodchild
(74) *Attorney, Agent, or Firm* — Finnegan, Henderson, Farabow, Garrett & Dunner, LLP

(57) ABSTRACT

This disclosure relates generally to a method and system for re-encryption of an encrypted data. State-of-the-art methods provide the re-encryption scheme for a specific Fully Homomorphic Encryption (FHE) encrypted data. However, a generic scheme that converts any given FHE scheme to an HPRE scheme is not yet achieved. The disclosed method provides re-encryption of the encrypted data transferred between a first user and a second user by a re-encryption key. The re-encryption key is obtained by splitting a private key of the first user into a primary private key and a secondary private key. The primary private key generates a public re-key component using probabilistic encryption algorithm; and the secondary private key generates a private re-key component using probabilistic switch key generation algorithm. Both the private re-key and the public re-key are consolidated further to generate the re-encryption key.

12 Claims, 6 Drawing Sheets

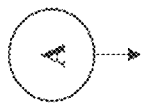

re-encrypting, via the one or more hardware processors, the ciphertext using a re-encryption key, to obtain a re-encrypted ciphertext wherein, generating the re-encryption key comprises:

obtaining a private re-key component by splitting a private key of the first public-private key pair into a primary private key part and a secondary private key part;

providing, the secondary private key part to the probabilistic switch key generation algorithm to obtain the private re-key component;

obtaining a public re-key component by providing the primary private key part to the probabilistic encryption algorithm along with a public key of the second public-private key pair to obtain the public re-key component;

consolidating the private re-key component and the public re-key component using a probabilistic rekey generation algorithm to obtain the re-encryption key transferring, via one or more hardware processors, the re-encrypted ciphertext without the re-encryption key

FIG. 3B

METHOD AND SYSTEM FOR RE-ENCRYPTION OF ENCRYPTED DATA BY GENERATING RE-ENCRYPTION KEY

PRIORITY CLAIM

This U.S. patent application claims priority under 35 U.S.C. § 119 to: Indian patent application Ser. No. 202321046971, filed on Jul. 12, 2023. The entire contents of the aforementioned application are incorporated herein by reference.

TECHNICAL FIELD

The disclosure herein generally relates to the field of secure transfer of data, and, more particularly, to a method and system for secure transfer of data using re-encryption of an encrypted data by generating a re-encryption key.

BACKGROUND

With the recent popularity of a cloud computing, a large volume of data is being outsourced to the cloud. When data providers upload their data to the cloud server in an unencrypted form, an unreasonable amount of trust needs to be placed on the cloud servers. While classical encryption methods prevent such data breaches, the users cannot operate on the encrypted data, and it needs to be downloaded locally in order to perform computations.

Fully Homomorphic Encryption (FHE) is a form of encryption that allows computations to be performed on encrypted data without first having to decrypt it. The resulting computations are left in an encrypted form which, when decrypted, results in an output that is identical to that produced had the operations been performed on the unencrypted data. The FHE can be used for privacy-preserving outsourced storage and computation. This allows data to be encrypted and out-sourced to decentralized storage network such as commercial cloud environments for processing, all while encrypted. The decentralized storage network would redefine data ownership, privacy, and accessibility. By leveraging FHE, the cloud server can perform homomorphic evaluation for a certain function on the stored data, and return the result of the evaluation, without compromising privacy. Other practical applications include medical data, data mining, anonymous database queries, outsourcing financial operations and image recognition, to name a few. Proxy re-encryption (PRE) allows a proxy server to convert a ciphertext encrypted under one key into an encryption of the same message under another key. The main idea is to place as little trust and reveal as little information to the proxy server as necessary to allow it to perform its translations. At the very least, the proxy server should not be able to learn the keys of the participants or the content of the messages it re-encrypts. However, in all prior PRE schemes, it is easy for the proxy server to determine between which participants a re-encryption key can transform ciphertexts. This can be a problem in practice. For example, in a secure distributed file system, content owners may want to use the proxy server to help re-encrypt sensitive information without revealing to the proxy the identity of the recipients.

Conventional methods transmit re-encrypted ciphertext of a sender via a proxy server along with a key that enables the sender to access the ciphertext. However, while sending the ciphertext along with the key, the ciphertext can be decrypted with a collision attack. Hence it is not a safe practice for secure transmission. Further, the conventional systems do not support generic conversion of multiple types of FHE schemes used for ciphertext generation. Even though FHE is gaining widespread popularity as it provides ease of secure transmission through PRE, current approaches independently handle FHE scheme to a Homomorphic Proxy Re-Encryption (HPRE) scheme based on the specific type of scheme identified.

SUMMARY

Embodiments of the present disclosure present technological improvements as solutions to one or more of the above-mentioned technical problems recognized by the inventors in conventional systems. For example, in one embodiment, a method of re-encrypting the encrypted data is provided. The method includes, receiving, a request to securely transfer data via corresponding one or more hardware processors, from a first user to a second user wherein the first user holds a first public-private key pair, and the second user holds a second public-private key pair. The secure data transfer is enabled by inputting a security parameter and obtaining a plurality of public parameters and a number of encryption levels required for such data transfer. The method further includes generating, via one or more hardware processors, a ciphertext from a plaintext associated with the data of the first user using a public key from the first public-private key pair using a probabilistic encryption algorithm. The ciphertext is transmitted via the one or more hardware processors of the first client machine to a proxy server machine, wherein the ciphertext is received by the proxy server machine. The method further includes, re-encrypting, via the one or more hardware processors, the ciphertext using a re-encryption key, to obtain a re-encrypted ciphertext wherein, generation of the re-encryption key further comprises, obtaining a private re-key component by splitting a private key of the first public-private key pair into a primary private key part and a secondary private key part; and providing, the secondary private key part to the probabilistic switch key generation algorithm to obtain the private re-key component. The public re-key component is obtained by providing the primary private key part to the probabilistic encryption algorithm along with a public key of the second public-private key pair. The re-encryption key generation further includes consolidating the private re-key component (generated at first user) and the public re-key component (generated at second user) using a probabilistic rekey generation algorithm. The method further includes, transferring, via one or more hardware processors, the re-encrypted ciphertext without the re-encryption key. The proxy-server performs the re-encryption mechanism and shares the re-encrypted ciphertext whenever the ciphertext is requested by the second user.

In another aspect, a system for re-encrypting the encrypted data is provided. The system includes a first user, a second user, a proxy server and a trusted third party server, wherein the proxy server, the first user and the second user comprises at least one memory storing programmed instructions; one or more Input/Output (I/O) interfaces; and one or more hardware processors of the proxy server machine, the first client machine and the second client machine are operatively coupled to a corresponding at least one memory, wherein the system is configured to receive, via the one or more hardware processors, a request to securely transfer data via corresponding one or more hardware processors, from a first user to a second user wherein the first user holds a first public-private key pair, and the second user holds a second public-private key pair. The secure data transfer is enabled by inputting a security parameter and obtaining a plurality of public parameters and a number of encryption levels required for such data transfer. Further, the system is configured to generate, via the one or more hardware processors, a ciphertext from a plaintext associated with the data of the first user using a public key from the first public-private key pair using a probabilistic encryption algorithm. The ciphertext is transmitted via the one or more hardware processors of the first client machine to a proxy server machine, wherein the ciphertext is received by the proxy server machine. Furthermore, the system is configured to generate, via the one or more hardware processors, the ciphertext using a re-encryption key, to obtain a re-encrypted ciphertext. The system is configured to generate, via the one or more hardware processors, the re-encryption key by obtaining a private re-key component by splitting a private key of the first public-private key pair into a primary private key part and a secondary private key part; and providing, the secondary private key part to the probabilistic switch key generation algorithm to obtain the private re-key component. And the public re-key component is obtained by providing the primary private key part to the probabilistic encryption algorithm along with a public key of the second public-private key pair. The system is configured to consolidate, via the one or more hardware processors, the private re-key component and the public re-key component using a probabilistic rekey generation algorithm to generate the re-encryption key. The system is configured to transfer, via the one or more hardware processors, the re-encrypted ciphertext without the re-encryption key. The proxy-server performs the re-encryption mechanism and shares the re-encrypted ciphertext whenever the ciphertext is requested by the second user.

In yet another aspect, a computer program product including a non-transitory computer-readable medium having embodied therein a computer program for re-encrypting the encrypted data is provided. The computer readable program, when executed on a computing device, causes the computing device to receive to receive, via the one or more hardware processors, a request to securely transfer data via corresponding one or more hardware processors, from a first user to a second user wherein the first user holds a first public-private key pair, and the second user holds a second public-private key pair. The secure data transfer is enabled by inputting a security parameter and obtaining a plurality of public parameters and a number of encryption levels required for such data transfer. Further, The computer readable program, when executed on a computing device, causes the computing device to generate, via the one or more hardware processors, a ciphertext from a plaintext associated with the data of the first user using a public key from the first public-private key pair using a probabilistic encryption algorithm. The ciphertext is transmitted via the one or more hardware processors of the first client machine to a proxy server machine, wherein the ciphertext is received by the proxy server machine. Furthermore, the computer readable program, when executed on a computing device, causes the computing device to generate, via the one or more hardware processors, the ciphertext using a re-encryption key, to obtain a re-encrypted ciphertext. Further, the computer readable program, when executed on a computing device, causes the computing device to generate, via the one or more hardware processors, the re-encryption key by obtaining a private re-key component by splitting a private key of the first public-private key pair into a primary private key part and a secondary private key part; and providing, the secondary private key part to the probabilistic switch key generation algorithm to obtain the private re-key component. The public re-key component is obtained by providing the primary private key part to the probabilistic encryption algorithm along with a public key of the second public-private key pair. The computer readable program, when executed on a computing device, causes the computing device to consolidate, via the one or more hardware processors, the private re-key component and the public re-key component using a probabilistic rekey generation algorithm to generate the re-encryption key. The computer readable program, when executed on a computing device, causes the computing device to transfer, via the one or more hardware processors, the re-encrypted ciphertext without the re-encryption key. The proxy-server performs the re-encryption mechanism and shares the re-encrypted ciphertext whenever the ciphertext is requested by the second user.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A and 3B are an exemplary flow diagrams for a method of re-encrypting the encrypted data, in accordance with some embodiments of the present disclosure.

DETAILED DESCRIPTION

Figure 1:
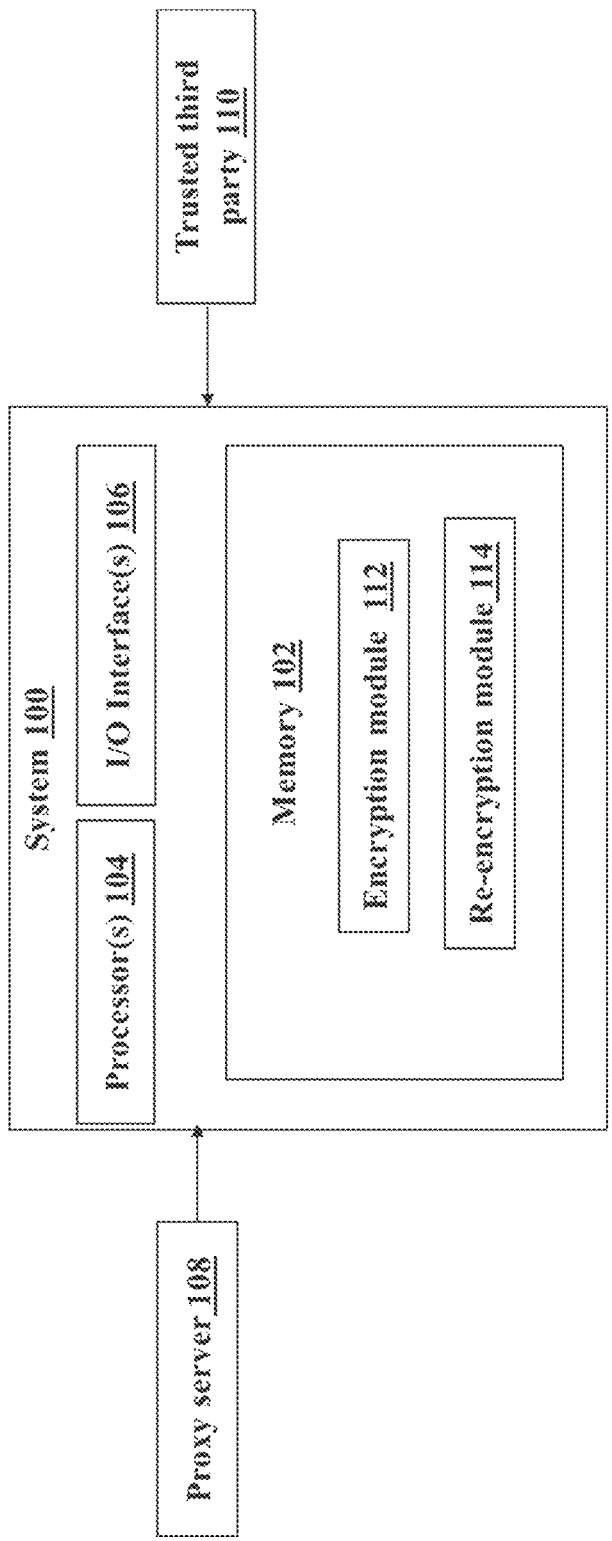
FIG. 1 illustrates a functional block diagram of a system for re-encrypted the encrypted data, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Recently, owing to the widespread popularity of Fully Homomorphic Encryption (FHE), coupled with the need for seamless sharing of enterprise data, a few attempts have been made towards achieving HPRE. One of the works in literature designed a unidirectional attribute based HPRE scheme, CPA secure based on the LWE assumption, which is also master secret-key secure. Their scheme is based on the FHE scheme by Gentry et al. Further, Li et al. designed an identity-based PRE scheme, that is single-hop, from learning with errors (LWEs) assumption. It is not an HPRE scheme, rather an ID-based PRE scheme, that enables re-encryption via homomorphic computation of keys and branching program. Bellafqira et al. designed a partial homomorphic PRE scheme based on the Damgard-Jurik cryptosystem using operation on groups. Kawai et al. designed two partial homomorphic proxy re-encryption scheme from group operations supporting bilinear groups, one supporting addition and another supporting degree-2 polynomials (in which the number of degree-2 terms is constant). Recently, Li et al. has given a construction of a proxy re-encryption scheme based on trapdoor sampling technique, which can be used to evaluate any L levels of circuit for an integer L. As evident from above, only one scheme by Li et al. has designed a leveled-HPRE scheme from LWE assumption. However, none of the results provide any generic result to support conversion of a FHE scheme to HPRE scheme.

The embodiments herein provide a method and system for re-encrypting the encrypted data. The re-encryption of the ciphertext is executed using a re-encryption key wherein re-encryption key is generated by splitting and consolidating the parts of public-private key pairs of the first user (e.g. sender) as well as the second user (e.g. receiver).

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates a functional block diagram of a system for re-encrypted the encrypted data, according to some embodiments of the present disclosure.

In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like. The I/O interface(s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) 106 can include one or more ports for connecting a number of devices to one another or to another server. The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the system 100 includes encryption module and re-encryption module, functionally connected to proxy server and trusted third party server for transmission of the encrypted as well as re-encrypted ciphertexts. In an embodiment, the memory 102 may include a database or repository. The system 100, further comprises of proxy server 108 and trusted third party server 110. The memory 102 may comprise information pertaining to input(s)/output(s) of each step performed by the processor(s) 104 of the system 100 and methods of the present disclosure.

In an embodiment, the database may be external (not shown) to the system 100 and coupled via the I/O interface 106. The memory 102, includes an encryption module 112 for processing a plaintext associated with data to be transferred to a ciphertext over proxy server. The memory 102 further includes re-encryption module 114 which processes the re-encryption of the encrypted ciphertext once modified at the user end, and further to be shared to another user. The memory 102 further includes a plurality of modules (not shown here) comprises programs or coded instructions that supplement applications or functions performed by the system 100 for executing different steps involved in the re-encryption of the encrypted data. The plurality of modules, amongst other things, can include routines, programs, objects, components, and data structures, which perform particular tasks or implement particular abstract data types. The plurality of modules may also be used as, signal processor(s), node machine(s), logic circuitries, and/or any other device or component that manipulates signals based on operational instructions. Further, the plurality of modules can be used by hardware, by computer-readable instructions executed by the one or more hardware processors 104, or by a combination thereof. The plurality of modules can include various sub-modules (not shown).

Figure 2:
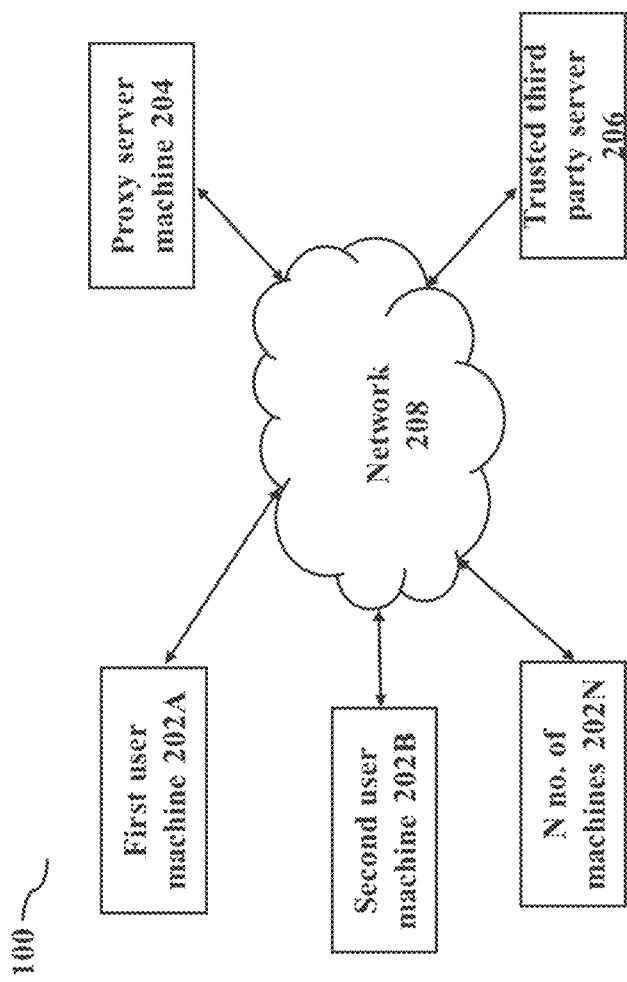
FIG. 2 illustrates a network hosting the system, according to some embodiments of the present disclosure.

FIG. 2 illustrates a network hosting the system, according to some embodiments of the present disclosure.

In an embodiment, the system 100 is hosted by a network and comprises one or more data storage devices or the memory 102 operatively coupled to the processor(s) 104 and is configured to store instructions for execution of steps of the method 200 by the processor(s) or one or more hardware processors 104. The system 100 includes a plurality of users connected through network devices such as user machine 202A, 202B through 202N, a proxy server machine 204, a network 208, and a trusted third-party server 206. The plurality of users through user machines 202A through 202N, the proxy server machine 204 and the trusted third-party server 206 connected by the network 208. In an embodiment, the network 208 can be a wireless or a wired network, or a combination thereof. In an example, the network 208 can be implemented as a computer network, as one of the different types of networks, such as virtual private network (VPN), intranet, local area network (LAN), wide area network (WAN), the internet, and such. The network 208 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 208 may include a variety of network devices, including routers, bridges, servers, computing devices, storage devices. The network devices within the network 208 may interact with the system 100 through communication links. In an embodiment, the plurality of users through user machines 202A through 102N, the proxy server machine 204, and the trusted third-party server 206 may be implemented as shown in FIG. 1. The plurality of user machines 202A through 202N, the proxy server machine 204, and the trusted third-party server 208 can be a hand-held device, a laptop or other portable computer, a tablet computer, a mobile phone, a PDA, a smartphone, and a desktop computer. The client machine 202 and the proxy server machine 204 may also be implemented in a workstation, a mainframe computer, a server, and a network server.

Figure 3A:
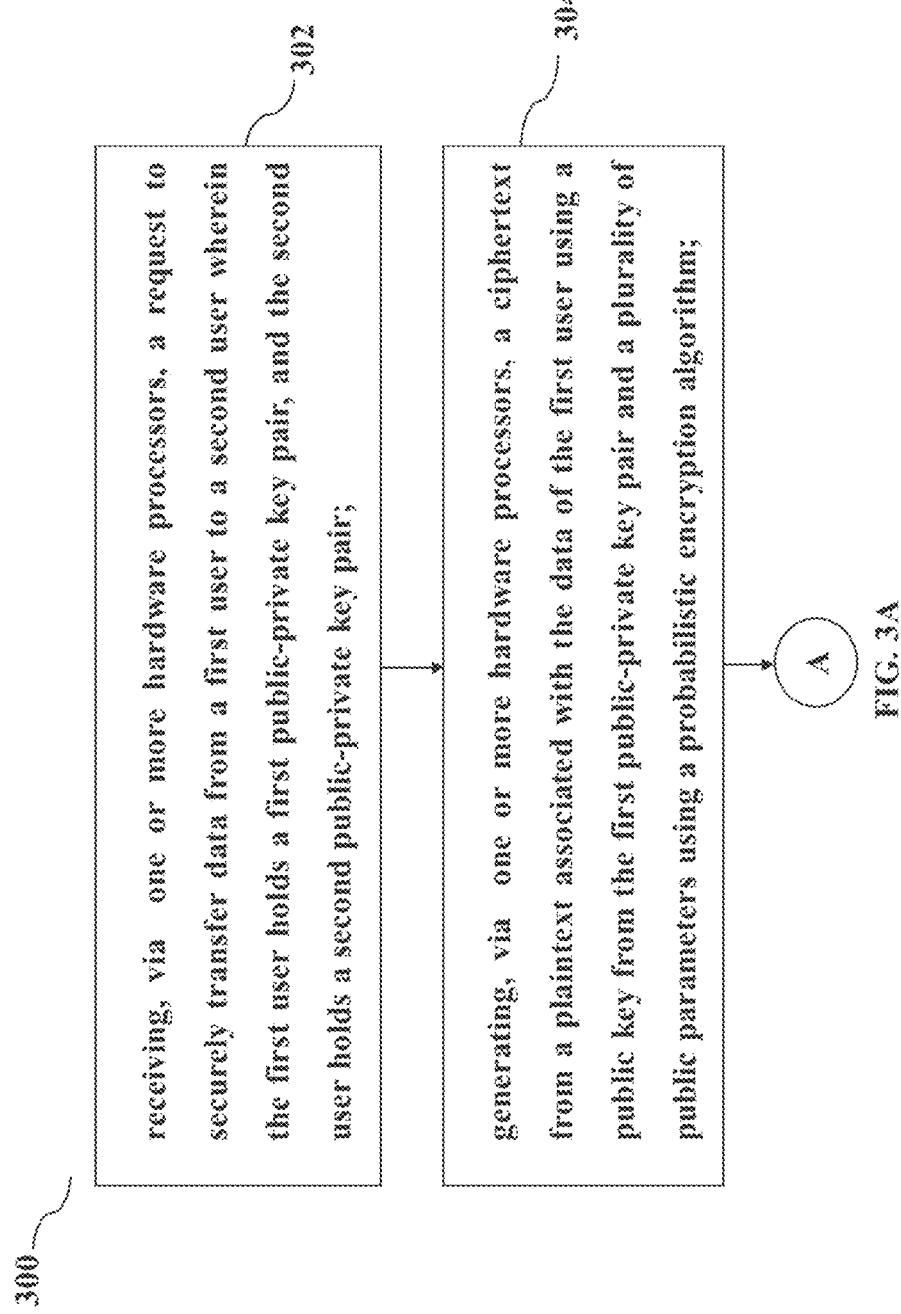

FIGS. 3A and 3B are an exemplary flow diagram s for a method of re-encrypting the encrypted data, in accordance with some embodiments of the present disclosure.

The steps of the method 300 of the present disclosure will now be explained with reference to the components or blocks of the system 100 as depicted in FIG. 1 through FIG. 4. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 302 of the method 300, the one or more hardware processors 104 are configured to receive a request to securely transfer data from a first user machine to a second user machine wherein the first user holds a first public-private key pair, and the second user holds a second public-private key pair. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

At step 302 of the method 300, the one or more hardware processors corresponding to the first user machine (any user machine from 202A through 202N) and the second user machine (any user machine from 202A through 202N other than the first user machine) receives a request to securely transfer data from a first user to a second user wherein the first user holds a first public-private key pair, and the second user holds a second public-private key pair. The secure data transfer is enabled by inputting a security parameter and obtaining a plurality of public parameters and a number of encryption levels required for such data transfer. For example, the present disclosure includes a Setup (K) function which takes the security parameter K as input and returns a set of public parameters params, shared by a plurality of users. At step 302 of the method 300, the one or more hardware processors of the first user machine generates the first public-private key pair of a first user based on the plurality of public parameters and the user index using the probabilistic key generation algorithm. In an embodiment, the probabilistic key generation algorithm is a Fully Homomorphic Encryption (FHE) based technique. Simultaneously, at step 302 of the method 300, the one or more hardware processors of the second user machine generates the second public-private key pair of the second user based on the plurality of public parameters and the user index using the probabilistic key generation algorithm. In an embodiment, the first and second public-private key pair corresponding to the first user/the first user machine and the second user/second user machine are generated using the function KeyGen(i, params). This parameter is a probabi-listic polynomial algorithm which takes as input a user index i and params. It returns the public-private key pair (pki, ski) of user i.

For example, the pseudocode for key generation function is given below.

Pseudocode : KeyGen(I, params)
For j = L down to 0, do:
Pick s' $\in_r \chi$n

Set value $s'_j = s_j \otimes s_j \in R_{qj}^{(n+1)C_2}$

Set $A' \in R_q^{(N+n)}$

Set $e \in_r \chi n \in_r$. Set $b = A's' + 2e$.
Set public key PK as A which is the (n + 1) column matrix consisting of b
Followed by then columns of −A'.

Set $s''_j = BitDecomp(S'_j, q_j)$.

Compute $T''_{s_{j+1}} \to s_j = SwitchKeyGen(s''_j, s_{j-1})$

At step 304 of the method 300, the one or more hardware processors of the first user machine generates the ciphertext from a plaintext associated with the data of the first user using a public key from the first public-private key pair and a plurality of public parameters using a probabilistic encryption algorithm. The probabilistic encryption algorithm is an FHE based algorithm. In an embodiment, the first user machine generates the ciphertext using the function Encrypt (m, pki, params). The encryption function is a probabilistic function which takes as input a plaintext m∈M, the public key pki of a user i and public parameters params and returns a ciphertext Ci corresponding to m which is allowed to be re-encrypted towards another user. The ciphertext Ci is termed as original ciphertext. For example, the pseudocode for encryption function is given below.

Pseudocode:
Encrypt (m, pki, params)
Given as input the plaintext m' $\in R_2$,

Set $m = )m', 0, \ldots , 0) \in R_q^{n+1}$.

Pick $r \in_r R_2^N$

Compute ciphertext $c = m + A^T r$

In an embodiment, the first user machine transmits the ciphertext to the proxy server machine and the ciphertext is received by the proxy server machine. The proxy server machine further transmits the ciphertext to the second user machine. The second user machine generates the resultant plaintext decrypting the encrypted ciphertext, based on the encrypted ciphertext, and the private key of the second public-private key pair of the second user using a probabilistic decryption algorithm Decrypt (Ci, ski, params). The decryption function is a deterministic algorithm which takes as input the private key skj of a user j, an original ciphertext Cj, and public parameters params and returns a plaintext m or the error symbol ⊥ if the ciphertext is invalid. For example, the formula for computing the resultant plaintext is m=[⟨C, s⟩ q]2 wherein the values inside ⟨ ⟩ brackets denotes the product.

At step 306 of the method 300, the one or more hardware processors of the first user machine performs re-encryption of the encrypted ciphertext using a re-encryption key. The re-encryption key generation algorithm is an FHE based technique. The re-encryption key is based on the first public-private key pair of the first user, the public key of the second user and the plurality of public parameter using the probabilistic re-encryption key generation algorithm. The method of generating the re-encryption key by the first client machine based on the private-public key pair of the first user, the public key of the second user and the plurality of public parameter using the probabilistic re-encryption key generation algorithm includes the following steps. Initially, a private re-key component is obtained by splitting a private key of the first public-private key pair into a primary private key part and a secondary private key part; and the secondary private key part is provided to the probabilistic switch key generation algorithm to obtain the private re-key component. Further, a public re-key component is obtained by providing the primary private key part to the probabilistic encryption algorithm along with a public key of the second public-private key pair to obtain the public re-key component. At step 306 of the method 300, the method 300, the one or more hardware processors of the first user machine consolidates the private re-key component and the public re-key component using a probabilistic rekey generation algorithm to obtain the re-encryption key. The probabilistic rekey generation algorithm ReKeyGen(ski, pkj, params) uses a key-splitting technique to divide the secret key into two parts sk1i and sk2i and invokes the FHE. SwitchKG (sk2i, pkj) algorithm, which returns a rekey component RK1. Additionally, the algorithm invokes the FHE.Encrypt (sk1i, pkj, params) algorithm which returns the second rekey component RK2. It returns a re-encryption key RK which is a consolidation of RK1 and RK2.

In an embodiment, the one or more hardware processors of the first client machine transmits the generated re-encryption key to the proxy server, wherein the re-encryption key is received by the proxy server. The proxy server generates the re-encrypted ciphertext based on the re-encryption key, the ciphertext and the plurality of public parameters using the probabilistic re-encryption algorithm. For example, the probabilistic re-encryption algorithm is an FHE based technique.

In an embodiment, the re-encrypted ciphertext is generated using the function Re-Enc(RK Ci, params). The re-encryption function is a probabilistic function which takes as input the re-encryption key RK, original ciphertext Ci encrypted under pki and public parameters params and returns ciphertext Cj encrypted under the public key pj. The ciphertext Cj is termed as re-encrypted ciphertext. The Re-Enc(RK Ci, params) algorithm invokes the FHE. Switch (RK, $C_i$, params) algorithm to re-encrypt the original ciphertext to the delegate $pk_j$.

In an embodiment, the present disclosure performs homomorphic evaluation of two ciphertexts associated with a used based on the corresponding public key, two ciphertexts encrypted under the public key of the user and the plurality of public parameters, wherein the homomorphic evaluation comprises multiplication and addition. The homomorphic evaluation using addition is performed using the function Eval-Add(pki, C1, C2, params). This summation function is a deterministic algorithm which takes as input a public key pki, two ciphertexts C1 and C2 encrypted under public key of user i and public parameters params and returns the summation of the two ciphertexts as Csum, evaluated homomorphically. For example, the pseudocode for Eval-Add (pki, C1, C2, params) function is given below:

$Eval\text{-}Add(pk_i, C_1, C_2, params)$

Compute $C_{sum} = C_1 + C_2 \mod q_i$

Return $C_{sum} = Scale(C_{sum} =, qi, q_{i-1}, params)$

In an embodiment, the homomorphic evaluation using multiplication is performed using the function Eval-Mul (pki, C1, C2, params). This multiplication algorithm is a deterministic algorithm which takes as input a public key pki, two ciphertexts C1 and C2 encrypted under public key of user i and public parameters params and returns the product of the two ciphertexts as Cmult homomorphically. For example, the pseudocode for Eval-Mul(pki, C1, C2, params) function is given below.

$Eval\text{-}Mul(pk_i, C_1, C_2, params)$

Compute coefficient vector: $C_{mult} = L_{C1,C2}(x \otimes x)$.

Return product: $C_{mult} = Scale(C_{mult}, q_i, q_{i-1}, params)$

At step 308 of the method 300, the one or more hardware processors of the proxy server machine transmits the re-encrypted ciphertext to the second user machine and is received by the second user without sending the re-encryption key. The second user is able to de-crypt the shared ciphertext using the private key of the second public-private key pair.

In an embodiment, the whole FHE to design a generic compiler that converts any FHE scheme to a HPRE scheme is presented. The generic FHE-PRE compiler takes any FHE scheme as an input, which includes, FHE parameter set, FHE primitive operations, such as setup, KeyGen, Encrypt, Decrypt, etc and provides new PRE primitives such as ReKeyGen, Re-Encrypt, etc, to enable PRE for that FHE scheme. The key-switching technique used in FHE schemes to design the re-encryption key and re-encryption algorithm to enable a compiler with such a transformation. The fully homomorphic algorithm is detailed as FHE=(FHE.Setup, FHE.KeyGen, FHE.Encrypt, FHE.Decrypt, FHE.SwitchKG, FHE.Switch, FHE.Eval-Add, FHE.Eval-Mul) be a CPA secure FHE scheme. A singlehop CPA secure HPRE scheme can be constructed as follows:

Setup(κ): The algorithm outputs public parameters params, in the same fashion as FHE.Setup(κ)

KeyGen(i, params): The algorithm invokes FHE.KeyGen (i, params) to return pair ($sk_i$, $pk_i$) for the $i^{th}$ user.

Encrypt(m, $pk_i$, params): The algorithm invokes algorithm FHE.Encrypt(m, $pk_i$, params) with its inputs and returns a first-level ciphertext $C_i$ returned by the encryption algorithm.

Decrypt($C_i$, $sk_i$, params): The algorithm invokes the FHE. Decrypt($C_i$, $sk_i$, params) algorithm with its inputs and returns a message m or error message ⊥ returned by the decryption algorithm.

ReKeyGen($sk_i$, $pk_j$, params): The algorithm uses a key-splitting technique to divide the secret key into two parts $sk_{1i}$ and $sk_{2i}$ and invokes the FHE.SwitchKG($sk_{2i}$, $pk_j$) algorithm, which returns a rekey component RK1. Additionally, the algorithm invokes the FHE.Encrypt ($sk_{1i}$, $pk_j$, params) algorithm which returns the second rekey component $RK_2$. It returns a re-encryption key RK which is a consolidation of $RK_1$ and $RK_2$.

ReEnc(RK, Ci, params): The algorithm invokes the FHE.Switch(RK, $C_i$, params) algorithm to re-encrypt the original ciphertext to the delegatee $pk_j$.

Eval-Add($pk_i$, $C_1$, $C_2$, params): The algorithm takes as input a set of ciphertexts encrypted under the same key and invokes FHE.Eval-Add($pk_i$, $C_1$, $C_2$, params) algorithm and returns the summation result as the evaluated ciphertext.

Eval-Mul ($pk_i$, $C_1$, $C_2$, params): The algorithm takes as input a set of ciphertexts encrypted under the same key and invokes FHE.Eval-Mul(pki, $C_1$, $C_2$, params) algorithm and returns the multiplication result as the evaluated ciphertext.

Figure 4:
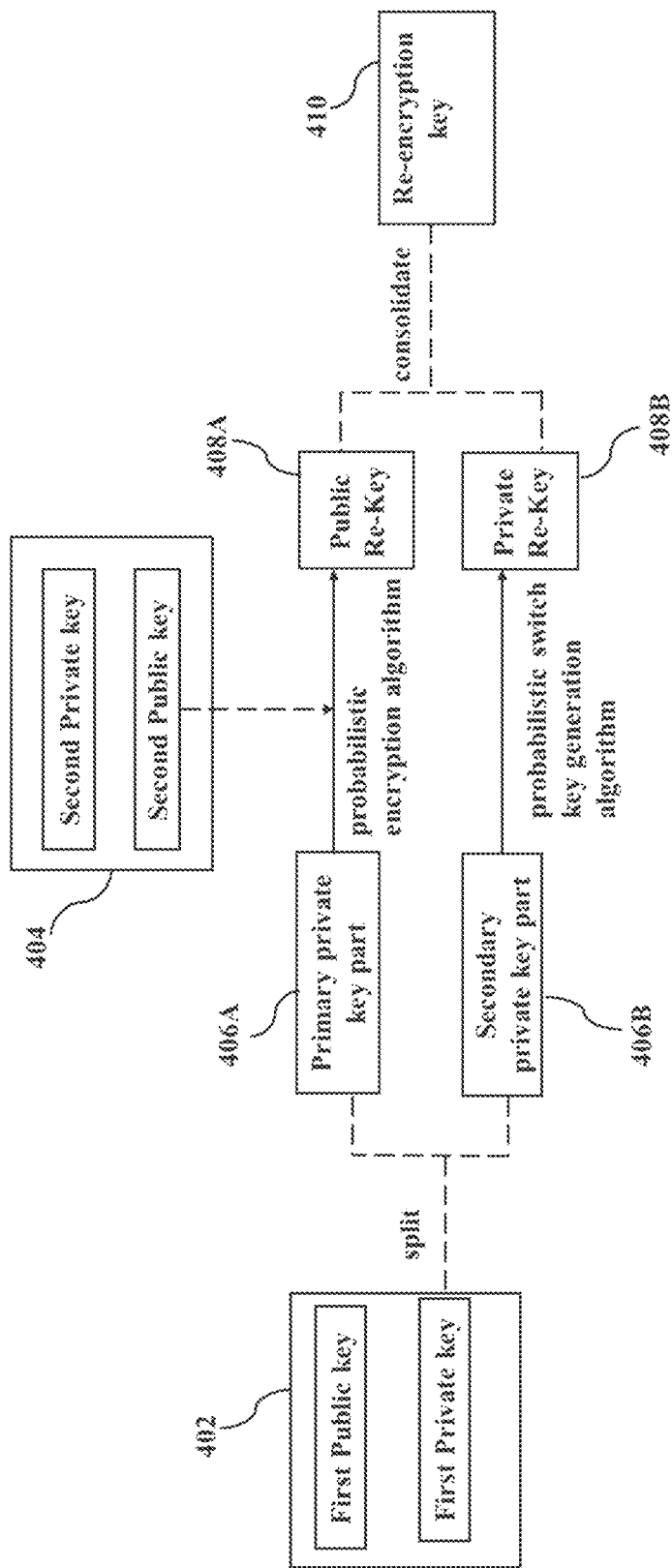
FIG. 4 illustrates a scheme for re-encryption key generation, in accordance with some embodiments of the present disclosure.

FIG. 4 illustrates a scheme for re-encryption key generation, in accordance with some embodiments of the present disclosure. As is illustrate, the first user machine, via the one or more hardware processors, generates the re-encryption key. The first user generates the first public-private key pair 402 comprising a public key and a private key. The second user generates the second public-private key pair 404 comprising a second public key and a second private key. The first public-private key pair and the second public-private key pair are generated using the probabilistic re-encryption key generation algorithm. Initially, the algorithm splits the private key of the first public-private key pair into a primary private key part 406A and a secondary private key part 406B. The primary private key part 406A is provided to the probabilistic encryption algorithm along with a public key of the second public-private key pair to obtain the public re-key component 408A. Similarly, secondary private key part 406B is provided to the probabilistic switch key generation algorithm to obtain the private Re-Key 408B. Finally, the one or more hardware processors of the first user machine consolidates the private re-key component 408B and the public re-key component 408A using a probabilistic rekey generation algorithm to obtain the re-encryption key.

Figure 5:
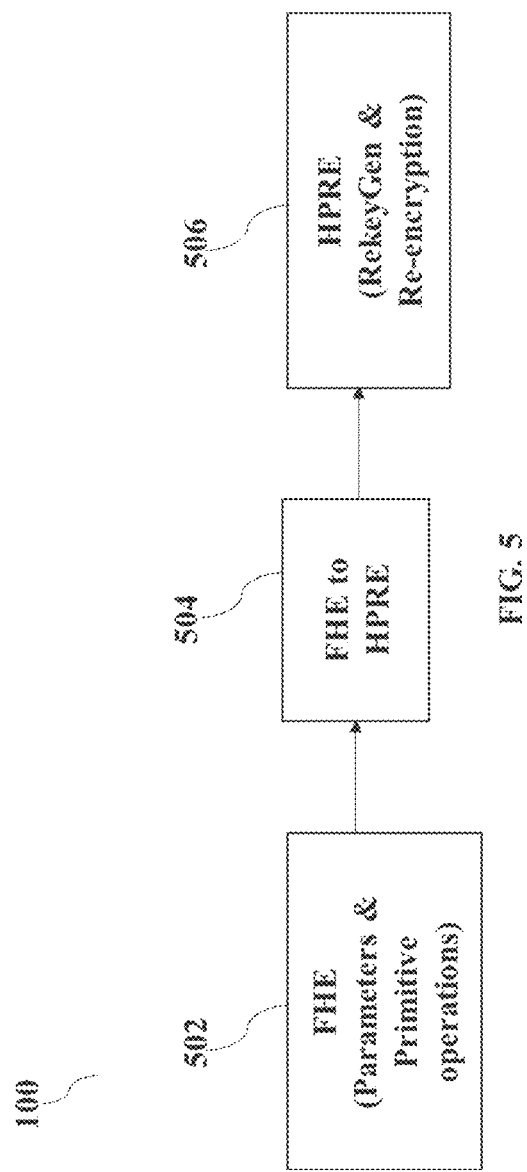
FIG. 5 is an illustration of a generic converter for converting FHE schemes to corresponding HPRE scheme.

FIG. 5 is an illustration of a generic converter for converting FHE schemes to corresponding HPRE scheme.

In an embodiment, the system 100 comprises of an FHE to HPRE converter 504 which comprises of plurality of modules for encryption, decryption and re-encryption. The converter 504 receives FHE scheme 502 along with plurality of parameters and primitive operations. FHE to HPRE converter 504 executes re-encryption of the ciphertext using the re-encryption key. The re-encryption key is generated by obtaining a private re-key component by splitting a private key of the first public-private key pair into a primary private key part and a secondary private key part. The secondary private key part is provided to the probabilistic switch key generation algorithm to obtain the private re-key component; and a public re-key component is obtained by providing the primary private key part to the probabilistic encryption algorithm along with a public key of the second public-private key pair to obtain the public re-key component. The private re-key component and the public re-key component are further consolidated using a probabilistic rekey generation algorithm to obtain the re-encryption key. The re-encryption key generation is executed on the proxy server machine. Finally, the re-encryption key enabled FHE to HPRE conversion scheme outputs the ciphertext encrypted under HPRE scheme. USE CASE:

An HPRE for Cheon-Kim-Kim-Song (CKKS) (Reference: Homomorphic encryption for arithmetic of approximate numbers." Advances in Cryptology—ASIACRYPT 2017: 23rd International Conference on the Theory and Applications of Cryptology and Information Security, Hong Kong, China, Dec. 3-7, 2017, Proceedings, Part I 23. Springer International Publishing, 2017.)

To check the efficiency of the method, CKKS type HFE is converted to an HPRE scheme. The CKKS homomorphic encryption (HE) scheme is currently the most efficient method to perform approximate homomorphic computations over real and complex numbers. The original CKKS scheme is given below:

---

Setup (κ): Given as input a security parameter κ, choose a power-of-two $M = M (κ, q_L)$, an integer $h = h (κ, q_L)$, an integer $P = P (κ, q_L)$ and a real value $σ = σ (κ, q_L)$.

KeyGen (params): Sample $s \leftarrow$ HWT (h), $a \leftarrow R_{q_l}$ and $e =$ DG ($σ^2$).
Set secret key sk $\leftarrow$ (1, s) and the public key pk $\leftarrow$ (b, a),
where $b \leftarrow -as + e$ (mod $q_L$).
Sample a' $\leftarrow R_{P_{q_L}}$ and e' $\leftarrow$ DG ($σ^2$). Set evaluation key evk $\leftarrow$ (b', a'),
where b' $\leftarrow -a'$ s' + e' + $Ps^2$ .
Encrypt (m, pk, params): Sample $\leftarrow$ ZO(0.5) and $e_0$, $e_1 \leftarrow$ DG($σ^2$).
Return $v \cdot$ pk + (m + $e_0$, $e_1$]).
Decrypt (c, sk, params): Return $b + a \cdot s$ (mod $q_l$)
Encode (z, Δ): For a (N/2) dimension vector $z = (z_j)_{j \in T}$ of Gaussian integers, compute the vector $[\Delta \cdot π^{-1} (z)]_{σ(R)}$ and return its inverse.
Decode (m): Return the closest vector of Gaussian integers $z = (z_j)_{j \in T}$ after scaling.

Switch(c): Return $c' \leftarrow \left[\frac{q'_1}{q_1} c\right]$

Eval-Add (pk, $c_1$, $c_2$, params): For $c_1$ and $c_2$, compute $c_{add} \leftarrow c_1 + c_2$ mod $q_l$
Eval-Mul (pk, $c_1$, $c_2$, params): For $c_1 = (b_1, a_1)$ and $c_2 = (b_2, a_2)$, compute $(d_0, d_1, d_2) = (b_1 b_2, a_1 b_2 + a_2 b_1, a_1 a_2)$ ( mod $q_l$).
Return$c_{mul} \leftarrow (d_0, d_1)) + [P^{-1} \cdot d_2 \cdot$ evk] mod $q_l$
In order to make CKKS scheme as HPRE, the following two algorithms are added to the existing CKKS FHE protocol.
ReKeyGen: Compute re-scaling algorithm $RS_{sk \rightarrow sk'}$.
ReEncrypt: Return C' $\leftarrow RS_{sk \rightarrow sk'}$ (C) with the original ciphertext.
Correctness of decryption of re-encrypted algorithm $\langle C', sk' \rangle =$ $\langle v \cdot pk' + m + e_0 e_1, sk' \rangle = \left\langle (v \cdot pk' + m + e_0 e_1) \frac{sk}{sk'} \right\rangle =$ $\langle vb + m + e_0 e_1 + va + vbs + ms + e_0 e_1 s + vas \rangle =$ $\langle -vas + ve + m + e_0 e_1 + va + vbs + e_0 e_1 s + vas \rangle =$ $\langle m + ve + e_0 e_1 + va \rangle = m$

---

The embodiments of present disclosure herein address the unresolved problem of a re-encryption of an encrypted data. The present disclosure provides a key splitting and key consolidation technique to re-encrypt the ciphertext which can transmit from one user (sender) to another user (receiver) without the need of sending a key. The receiver is able to de-crypt such transmitted ciphertext with his own private key generated initially as public-private key pair. Combining evaluation of an encrypted text feature of FHE and the unidirectional single-hop PRE scheme provided a generic transformer that enables seamless conversion of any FHE scheme to a HPRE scheme so that the existing FHE protocols can be upgraded with the added features of re-encryption.

Further, the present disclosure is suitable for conversion of all types of FHE schemes such as Fast Fully Homomorphic Encryption (TFHE), Brakerski-Gentry-Vaikuntanathan (BGV), Brakerski/Fan-Vercauteren (BFV), Cheon-Kim-Kim-Song (CKKS), Ducas-Micciancio (DM) and Chillotti-Gama-Georgieva-Izabachene (CGGI) to HPRE. Further, the present disclosure provides key less transmission of the re-encrypted ciphertext which provide more trusted transmission as it ensures secure transfer of sensitive information over the cloud.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method of re-encrypting the encrypted data, the method comprising:

receiving, via one or more hardware processors, a request to securely transfer data from a first user to a second user wherein the first user holds a first public-private key pair, and the second user holds a second public-private key pair;

generating, via the one or more hardware processors, a ciphertext from a plaintext associated with the data of the first user using a public key from the first public-private key pair and a plurality of public parameters using a probabilistic encryption algorithm;

re-encrypting, via the one or more hardware processors, the ciphertext using a re-encryption key, to obtain a re-encrypted ciphertext, wherein generating the re-encryption key comprises:

obtaining a private re-key component by splitting a private key of the first public-private key pair into a primary private key part and a secondary private key part;

providing, the secondary private key part to the probabilistic switch key generation algorithm to obtain the private re-key component; and obtaining a public re-key component by providing the primary private key part to the probabilistic encryption algorithm along with a public key of the second public-private key pair to obtain the public re-key component;

consolidating the private re-key component and the public re-key component using a probabilistic rekey generation algorithm to obtain the re-encryption key; and transferring, via the one or more hardware processors, the re-encrypted ciphertext without the re-encryption key, wherein the second user decrypts the re-encrypted ciphertext using private key of the second public-private key pair.

2. The method as claimed in claim 1, wherein the probabilistic re-encryption algorithm is executed on a proxy server for re-encryption.

3. The method as claimed in claim 1, wherein the homomorphic evaluations performed by the first user or the second user on the ciphertext and the re-encrypted ciphertext comprises multiplication and addition.

4. The method as claimed in claim 1, wherein the encrypted ciphertext and the re-encrypted ciphertext are evaluated through FHE schemes wherein the FHE schemes are selected from Fast Fully Homomorphic Encryption (TFHE), Brakerski-Gentry-Vaikuntanathan (BGV), Brakerski/Fan-Vercauteren (BFV), Cheon-Kim-Kim-Song (CKKS), Ducas-Micciancio (DM) and Chillotti-Gama-Georgieva-Izabachene (CGGI).

5. A system, comprising:
a memory storing instructions;
one or more communication interfaces; and
one or more hardware processors coupled to the memory via the one or more communication interfaces, wherein the one or more hardware processors are configured by the instructions to:
receive a request to securely transfer data from a first user connected to the system via a first user machine to a second user connected to the system via a second user machine, wherein the first user holds a first public-private key pair, and the second user holds a second public-private key pair;
generate a ciphertext from a plaintext associated with the data of the first user using a public key from the first public-private key pair and a plurality of public parameters using a probabilistic encryption algorithm;
re-encrypt the ciphertext using a re-encryption key, to obtain a re-encrypted ciphertext, wherein generating the re-encryption key comprises:
obtaining a private re-key component by splitting a private key of the first public-private key pair into a primary private key part and a secondary private key part;
providing, the secondary private key part to the probabilistic switch key generation algorithm to obtain the private re-key component; and
obtaining a public re-key component by providing the primary private key part to the probabilistic encryption algorithm along with a public key of the second public-private key pair to obtain the public re-key component;
consolidate the private re-key component and the public re-key component using a probabilistic rekey generation algorithm to obtain the re-encryption key; and
transfer the re-encrypted ciphertext without the re-encryption key, wherein the second user decrypts the re-encrypted ciphertext using private key of the second public-private key pair.

6. The system as claimed in claim 5, wherein the probabilistic re-encryption algorithm is executed on a proxy server machine for re-encryption.

7. The system as claimed in claim 5, wherein the homomorphic evaluations performed by the first user or the second user on the ciphertext and the re-encrypted ciphertext comprises multiplication and addition.

8. The system as claimed in claim 5, wherein the encrypted ciphertext and the re-encrypted ciphertext are evaluated through FHE schemes wherein the FHE schemes are selected from Fast Fully Homomorphic Encryption (TFHE), Brakerski-Gentry-Vaikuntanathan (BGV), Brakerski/Fan-Vercauteren (BFV), Cheon-Kim-Kim-Song (CKKS), Ducas-Micciancio (DM) and Chillotti-Gama-Georgieva-Izabachene (CGGI).

9. One or more non-transitory machine-readable information storage mediums comprising one or more instructions which when executed by one or more hardware processors cause:
receiving a request to securely transfer data from a first user to a second user wherein the first user holds a first public-private key pair, and the second user holds a second public-private key pair;
generating a ciphertext from a plaintext associated with the data of the first user using a public key from the first public-private key pair and a plurality of public parameters using a probabilistic encryption algorithm;
re-encrypting the ciphertext using a re-encryption key, to obtain a re-encrypted ciphertext wherein, generating the re-encryption key comprises:
obtaining a private re-key component by splitting a private key of the first public-private key pair into a primary private key part and a secondary private key part;
providing, the secondary private key part to the probabilistic switch key generation algorithm to obtain the private re-key component; and
obtaining a public re-key component by providing the primary private key part to the probabilistic encryption algorithm along with a public key of the second public-private key pair to obtain the public re-key component;
consolidating the private re-key component and the public re-key component using a probabilistic rekey generation algorithm to obtain the re-encryption key; and
transferring the re-encrypted ciphertext without the re-encryption key, wherein the second user decrypts the re-encrypted ciphertext using private key of the second public-private key pair.

10. The one or more non-transitory machine-readable information storage mediums of claim 9, wherein the probabilistic re-encryption algorithm is executed on a proxy server for re-encryption.

11. The one or more non-transitory machine-readable information storage mediums of claim 9, wherein the homomorphic evaluations performed by the first user or the second user on the ciphertext and the re-encrypted ciphertext comprises multiplication and addition.

12. The one or more non-transitory machine-readable information storage mediums of claim 9, wherein the encrypted ciphertext and the re-encrypted ciphertext are evaluated through FHE schemes wherein the FHE schemes are selected from Fast Fully Homomorphic Encryption (TFHE), Brakerski-Gentry-Vaikuntanathan (BGV), Brakerski/Fan-Vercauteren (BFV), Cheon-Kim-Kim-Song (CKKS), Ducas-Micciancio (DM) and Chillotti-Gama-Georgieva-Izabachene (CGGI).

* * * * *